Patented Apr. 8, 1941

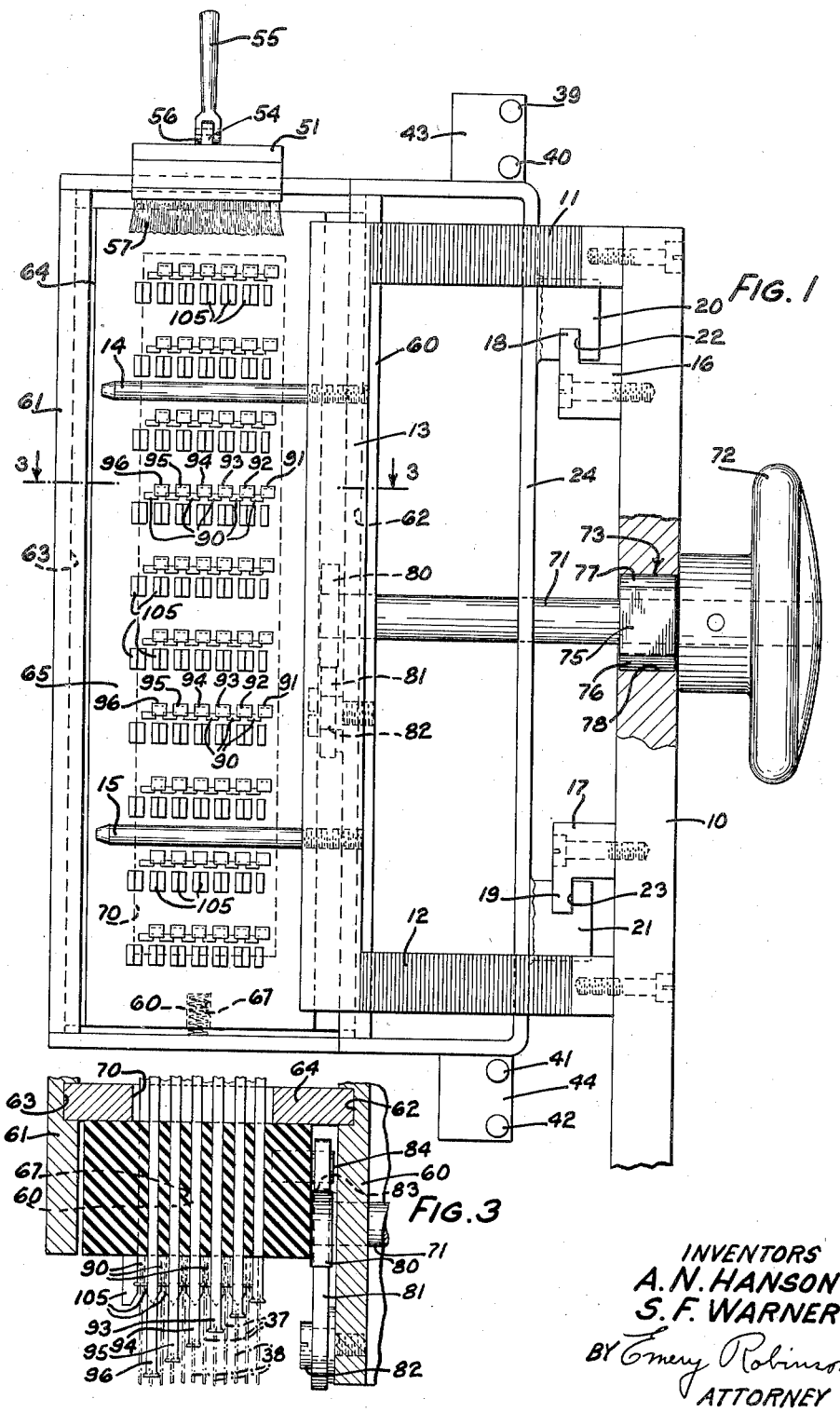

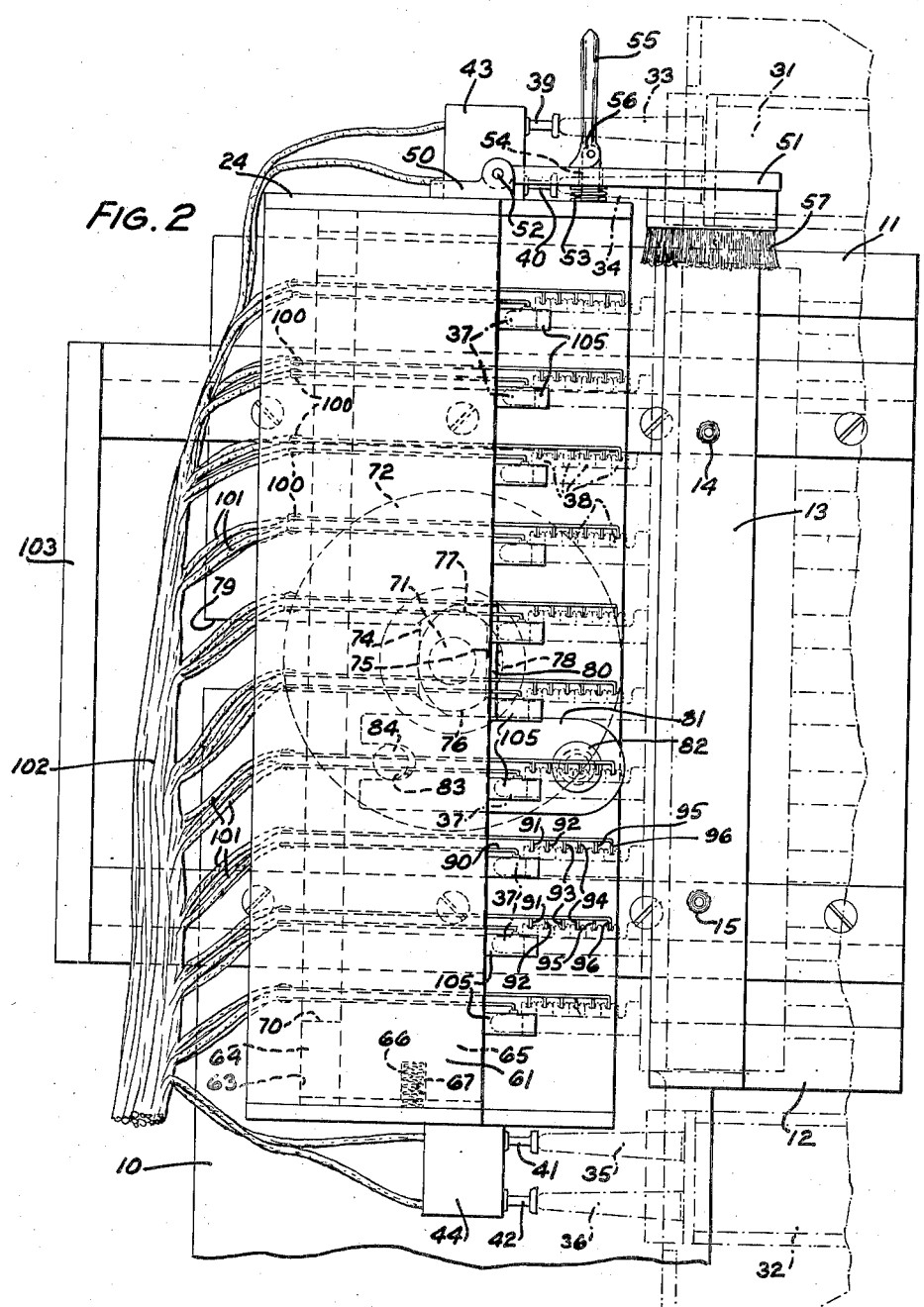

2,237,666

UNITED STATES PATENT OFFICE 2,237,666

TESTING APPARATUS

Arvid N. Hanson, Hinsdale, and Stanley F. Warner, Forest Park, Ill., assignors to Western Electric Company, Incorporated, New York, N. Y., a corporation of New York Application April 12, 1939, Serial No. 267,422

15 Claims. (Cl. 179—175.1)

This invention relates to testing apparatus and more particularly to apparatus for connecting the terminals of telephone exchange equipment to electrical testing circuits.

It is an object of the present invention to provide a simple mechanism for quickly connecting electrical apparatus to a testing circuit.

In accordance with one embodiment of the invention, apparatus is provided for holding a telephone switching unit, known as a "multi-contact relay" in position to be tested, wherein the relay to be tested is mounted on a stationary framework and a movable framework, carrying a plurality of rows of contact springs, which act as terminals of the testing circuit and which are insulated one from another, is moved toward the stationary framework to carry the plurality of rows of springs into position over their associated terminals of the relay. The contact springs are then all moved simultaneously at right angles to the direction of the previous movement thereof to carry all of the springs into engagement with the terminals of the relay. The movable framework is mounted upon tracks and may be freely slid toward the stationary framework by means of a slidable and rotatable hand lever which is fixed against rotation until the springs are in vertical alignment with the terminals of the relay, whereupon rotation of the hand lever will bring all of the springs simultaneously into engagement with the terminals and will lock the movable framework against movement along its track. The movable framework carries a series of projections for directing some of the terminals into association with their respective springs to prevent contact by the springs with terminals not associated with them and the movable framework also carries spring pressed contacts for engaging with the terminals of the relay coils and a brush type contactor for engaging parts of the relay frame.

A better understanding of the invention may be had by reference to the following detailed description of one embodiment thereof, when considered in conjunction with the accompanying drawings, wherein Fig. 1 is a front elevational view of an apparatus embodying the invention, having a part thereof broken away to conserve space;

Fig. 2 is a side elevational view of the structure shown in Fig. 1 with a multi-contact relay shown in dot and dash lines thereon in position to be tested; and Fig. 3 is a fragmentary sectional view taken on the line 3—3 of Fig. 1 in the direction of the arrows.

Referring to the drawings, wherein like reference characters designate the same parts throughout the several views, the numeral 10 designates a main support member for supporting the entire apparatus. This support member extends downwardly beyond the point where it is broken off and may be mounted or secured upon any suitable base or may be fixed to a work bench where the apparatus will be within easy reach of a person using it for testing multi-contact relays. The main support member 10 has fixed thereto a pair of brackets 11 and 12, which extend outwardly to the left (Fig. 1) from the member 10 and carry a vertically extending bar 13 on which are mounted a pair of relay supporting pins 14 and 15. Also mounted upon the member 10 are a pair of brackets 16 and 17, which carry upwardly and downwardly extending rails 18 and 19, respectively, for cooperation with movable frame slides 20 and 21, respectively. The slides 20 and 21 are slotted at 22 and 23 to receive the rails 18 and 19, respectively, and the slides are fixed to a U-shaped movable framework 24, which carries all of the contacting devices of the apparatus which are to be moved into engagement with various parts of the relay under test. It should be noted that the left end of the rails 18 and 19 are connected together by means of a stop bar 103, which prevents movement of the movable frame 24 off of the rails due to the engagement of the slides 20 and 21 with the stop bar 103.

The relay, which is to be connected to a testing circuit by the particular apparatus illustrated herein, includes, as shown in Fig. 2, in dot and dash lines, a pair of actuating coils 31 and 32, the upper coil 31 being designed to be actuated by the completion of an electrical circuit thereto through a pair of terminals 33 and 34 and the lower coil being provided with a pair of similar terminals 35 and 36. The completion of a circuit through these terminals and the coils 31 and 32 of the relay will cause the relay to close either the upper half of its contacts or the lower half thereof, depending upon which of the coils 31 or 32 is energized. The contact terminals of the relay under test are formed integrally with the contacts of the relay, which are adapted to be closed by the coils 31 and 32, and all the stationary contacts of the relay have terminals of the same length, which terminals are designated in Figs. 2 and 3, by the reference numeral 37, whereas the terminals formed integrally with the movable contacts of the relay are of varying lengths to facilitate making the electrical connections to them and are designated, in Figs. 2 and 3, by the reference numeral 38. The various terminals 37 and 38 are insulated one from another by strips of insulation, not shown, and are spaced apart by metal separators interposed between the layers of insulating material, whereby the terminals 37 and 38 are held in spaced relation.

The terminals 33, 34, 35, and 36 of the coils 31 and 32 are adapted to be connected to the testing circuit, not shown, by plunger type contacts 39, 40, 41 and 42, respectively. The contacts 39 and 40 are positioned in a block 43 of insulating material mounted on the upper horizontally disposed portion of the movable framework 24 and the contacts 41 and 42 are mounted in a block of insulating material 44, supported by the lower horizontally disposed portion of the framework 24. These contacts 39 to 42, inclusive, will be moved into engagement with their associated terminals 33 to 36, inclusive, upon movement of the movable framework 24 toward the bar 13, which supports the relay under test, and the contacts 39 to 42, inclusive, are of the usual spring-pressed type, which will resiliently engage with the end of the terminals.

Also mounted upon the upper portion of the movable framework 24 is a bracket 50, on which there is pivotally mounted a brush supporting plate 51. The brush supporting plate 51 is normally urged to rock about a pivot 52, mounted on the bracket 50, by a compression spring 53, which surrounds a pin 54 fixed to the framework 24. Pivotally secured to the upper end of the pin 54 is a cam lever 55, which has a cam 56 formed on the lower end thereof, and which, when in the position shown, holds a brush 57 mounted on the end of the brush supporting plate 51 in its lowermost position, where it will engage the separator plates of the relay.

Between the two horizontally extending arms of the U-shaped movable framework 24, there are positioned a pair of guide plates 60 and 61 having slots 62 and 63, respectively, formed therein for receiving a contact support 64, which is slidable in the slots. The contact support 64 has suitably mounted thereon a plurality of rows of contact members, which may be assembled on the contact support 64 in any suitable manner by assembling superposed layers of insulating material having cut-outs therein for receiving contacts or, as is shown in the present case, may be a molded block 65 of insulating material with the contacts molded in position in the block. The block 65 and the contact support 64 are fixed one to another and are normally urged upwardly away from the lower horizontal arm of the framework 24 by a compression spring 66 seated in a depression 67 in the block 65 and bearing against the lower horizontal arm of the framework 24. The contact support 64 is cut out, as shown at 70, in the area thereof adjacent the contacts carried by it to permit the contacts to pass through it without engaging it.

Rotatable in the vertically extending portion of the framework 24 and in the guide plate 60 is an actuating lever 71 having a knob or hand wheel 72 fixed to the end thereof. The shank of the lever 71 has a locking portion formed thereon, as shown at 73. This locking portion comprises two flat surfaces 74 and 75 and two rounded surfaces 76 and 77. In the position shown, the rounded surfaces 76 and 77 are in engagement with the wall 78 of a semi-circular opening formed in the main support member 10, and when the shaft 71 is in this position, the movable framework 24 cannot be moved, but is locked in position by the engagement of the surfaces 76 and 77 with the wall 78. This semi-circular opening is at the end of a slot 79, also formed in the member 10, which slot 79 is adapted to receive the portion 73 of the shank of the lever 71 with the flat surfaces 74 and 75 engaging the opposite surfaces of the slot to prevent rotation of the lever in any of the adjusted positions of lever 71, except when it is at the extreme right end (Fig. 2) of its movement.

Mounted on the left end of the lever 71 (Figs. 1 and 3), is a cam 80, which cooperates with a pivoted lever 81, pivotally mounted on the plate 60, by means of a pivot pin 82. The lever 81 is forked at its left end (Fig. 2), as shown at 83, and receives a pin 84 in the forked portion thereof, which pin is fixed in the block 65, whereby, upon rotation of the lever 71 to the position shown, the cam 80 will move the block 65 and contact support 64 downwardly to the position shown. When the lever 71 is rotated in a counter-clockwise direction, the cam 80 will permit the lever 81 to rock about its pivot and the spring 66 will move the block 65 and contact support 64 up slightly from the position shown. A rotation of the lever 71 in a counter-clockwise direction, as just described, will also bring the flat sides 74 and 75 of the portion 73 of the shank into registration with the slot 79, whereby the movable framework 24 and all of the parts supported thereby may be moved to the left (Fig. 2) so that a relay, such as that shown in dot and dash lines, may be positioned on the pins 14 and 15.

The contacts carried by the block 65, and mentioned generally hereinbefore, comprise a series of rows of contacts or contact fingers 90, 91, 92, 93, 94, 95 and 96, there being six of the contact fingers 90 in each row thereof and one each of the contacts 91, 92, 93, 94, 95 and 96 in each row. It will be noted that the contacts 91 to 95, inclusive, are progressively longer, from right to left (Figs. 1 and 3), and this construction is provided to make contact with the terminals 38, which are progressively shorter from right to left, as seen in dot and dash lines in Fig. 3, and that the contacts 90 are shorter than the contacts 91 since terminals 37 are longer than the terminals 38. Each of the contact fingers 90 to 96, inclusive, have a bent knife-edged portion at their ends, whereby they will engage projections formed on the terminals 37 and 38. The terminals 37 are guided into position under the contacts 90 by a plurality of projections 105 on the front of the block 65 when the movable framework 24 is moved to the position shown. The projections 105 are made of insulating material and have their extending ends tapered so that any terminal 37 which has been bent out of its normal position in handling the relay will be guided into association with the proper contact 90. These projections 105 may be formed integrally with the block 65 or may be assembled therewith in any suitable manner. The contacts 90 to 96, inclusive, extend to the right of the block 65 (Fig. 2) and in addition are provided with terminal ends 100, which extend out to the left of the block 65 to receive wires 101, which are grouped together in a cable 102, extending to suitable testing circuits, not shown, whereby break-down tests may be made between the various contacts of the relay under test, which are connected through the contacts 90 to 96, inclusive, to the cable. Other operation tests of the relay may also be made by circuits (not shown) connected to the wires 101 while the relay is mounted in the apparatus.

It is believed that a brief description of the mode of operation of the apparatus described hereinbefore will facilitate an understanding of the details thereof, and accordingly, the following brief description of the method followed in using the apparatus is presented.

The knob or hand wheel 72 may be rotated in a counter-clockwise direction from the position shown in Figs. 1 and 2 to rotate the actuating lever 71 approximately one-fourth of a revolution, thereby to bring the flat surfaces 74 and 75 of the portion 73 of the lever 71 into registry with the slot 79, whereupon the entire movable framework 24, and all of the apparatus carried thereby, may be moved to the left (Fig. 2). Rotation of the shaft 71 one-fourth of a turn in a counter-clockwise direction will permit the spring 66 to raise the contact support 64 and block 65 upwardly an amount sufficient to lift all of the contacts 90 to 96, inclusive, out of engagement with their associated terminals 37 and 38, and after the contacts have thus been disengaged from the terminals, the movable frame carrying the contacts with it may be moved to the left, it being assumed that the brush 57 has been disengaged from the separators of the relay by moving the cam lever 55 in a clockwise direction to permit the brush supporting plate 51 to move upwardly prior to the movement of the movable framework 24 to the left (Fig. 2). After the movable framework 24 has been moved to the point where the slides 20 and 21 engage the stop bar 103, the relay may be removed from the pins 14 and 15 and a new relay placed thereon to be tested. The lever 71 may then be moved to the right (Fig. 2) by means of the knob or hand wheel 72 and in so doing will carry the contacts 90 to 96, inclusive, into position above the terminals 37 and 38 and will cause the spring-pressed, plunger-type contacts 39, 40, 41 and 42 to engage the terminals 33, 34, 35 and 36, respectively, to connect the coils 31 and 32 to the testing circuit, not shown. When the movable frame 24 reaches its extreme right-hand position (Fig. 2), the knob 72 may be turned in a clockwise direction to simultaneously move all of the contacts 90 to 96, inclusive, into engagement with their associated terminals 37 and 38. Rotation of the knob 72 will cause the locking portion 73 to turn in the semi-circular opening at the end of slot 79 and will lock the framework 24 against movement until the contacts 90 to 96, inclusive, are disengaged from their associated terminals 37 and 38 by a counter-clockwise rotation of the lever 71. The brush 57 may then be cammed into engagement with the separators of the relay and the relay is then ready to be tested, all the terminals and frame thereof having been connected to the separate wires in the cable 102.

Although a specific embodiment of the invention has been described hereinbefore, it will be understood that many modifications and adaptations thereof may be made without departing from the scope of the appended claims.

What is claimed is:

1. A testing apparatus comprising a frame for supporting an article to be tested, a plurality of contacting elements for engaging spaced parts of the article to be tested, and a lever for moving said contactors simultaneously in one plane into position to engage parts of the article to be tested and for moving said contactors in another plane to engage the parts of the article.

2. In a testing apparatus for connecting electrical equipment to testing circuits, a plurality of contactors, means for supporting the equipment to be tested, means for moving the contactors into position adjacent the equipment to be tested, and means controlled by said last-mentioned means for imparting a second movement to the contactors to move the contactors into engagement with the equipment to be tested.

3. An apparatus for connecting electrical equipment to be tested to a testing circuit, means for supporting the electrical equipment, means movable with respect to said means for engaging spaced portions of the equipment to be tested, and a lever operable to move the movable means in two different planes to engage spaced parts of the equipment to be tested.

4. In a testing apparatus for connecting electrical equipment to be tested to a testing circuit, a supporting frame for holding the equipment to be tested, a block carrying a plurality of contactors for engagement with spaced portions of the equipment to be tested, and a single means for moving said block in two planes at right angles to one another for engaging the contactors with spaced portions of the equipment to be tested.

5. In an apparatus for connecting electrical equipment to be tested to a testing circuit, a movable framework, a block carried by said movable framework, a plurality of rows of contactors mounted on said block, and a lever movable bodily to carry the block into position adjacent the equipment to be tested and rotatable to move the block to a position where the rows of contactors will engage spaced parts of the equipment to be tested.

6. An apparatus for connecting multi-contact relays to testing circuits comprising means for supporting a relay in position to be tested, a plurality of contacts for engaging terminals of the relay, and a rotatable and slidable means, slidable for moving the contactors simultaneously into position adjacent the terminals of the relay and thereafter rotatable for engaging the contactors with the terminals of the relay.

7. In a testing apparatus for connecting electrical testing circuits to electrical equipment to be tested, a plurality of contactors connected to the testing circuit, a support for the article to be tested, and a common means for moving the contactors in two different planes to engage them with terminals of the equipment to be tested.

8. In a testing apparatus for connecting electrical testing circuits to electrical equipment to be tested, a plurality of contactors connected to the testing circuit, a support for the article to be tested, a common means for moving the contactors in two different planes to engage them with terminals of the equipment to be tested, and means on said common means for preventing movement of the contactors in one plane until they have been moved out of engagement with the terminals of the equipment to be tested.

9. An apparatus for connecting multi-contact relays to testing circuits comprising means for supporting a relay in position to be tested, a plurality of contacts for engaging terminals of the relay, and a rotatable and slidable means, slidable for moving the contacts towards the relay and thereafter rotatable for engaging the contactors with the terminals of the relay.

10. An apparatus for connecting multi-contact relays to testing circuits, comprising means for supporting a relay in position to be tested, a plurality of contacts for engaging terminals of the relay, a rotatable and slidable means, slidable for moving the contacts towards the relay and thereafter rotatable for engaging the contactors with the terminals of the relay, and means for preventing rotation of the rotatable means in all except one of its slidable positions.

11. An apparatus for connecting multi-contact relays to testing circuits comprising means for supporting a relay in position to be tested, a plurality of contacts for engaging terminals of the relay, a rotatable and slidable means, slidable for moving the contacts towards the relay and thereafter rotatable for engaging the contactors with the terminals of the relay, and means for preventing sliding movement of the rotatable and slidable means in all except one of its rotatable positions.

12. An apparatus for connecting multi-contact relays to testing circuits comprising means for supporting a relay in position to be tested, a plurality of contacts for engaging terminals of the relay, a rotatable and slidable means, slidable for moving the contacts towards the relay and thereafter rotatable for engaging the contactors with the terminals of the relay, and means associated with predetermined ones of said contacts for guiding the terminals to be engaged thereby into association therewith during the movement of the contacts toward the relay.

13. An apparatus for connecting multi-contact relays to testing circuits comprising means for supporting a relay in position to be tested, a plurality of contacts for engaging terminals of the relay, a rotatable and slidable means, slidable for moving the contacts towards the relay and thereafter rotatable for engaging the contactors with the terminals of the relay, and means associated with predetermined ones of said contacts for guiding the terminals to be engaged thereby into association therewith during the movement of the contacts toward the relay, said last-mentioned means comprising a plurality of tapered members positioned beneath the contacts.

14. In an apparatus for connecting electrical equipment to be tested to a testing circuit, movable framework, a block carried by said movable framework, a plurality of rows of contactors mounted on said block, a lever movable bodily to carry the block into position adjacent the equipment to be tested and rotatable to move the block to a position where the rows of contactors will engage spaced parts of the equipment to be tested, and a cam actuated wire brush carried by the movable framework for interconnecting parts of the frame of the equipment to be tested and connecting them to the testing circuit.

15. An apparatus for connecting multi-contact relays to electrical testing circuits comprising a movable framework, a contact support slidably mounted on said framework, a spring normally holding said contact support in an elevated position, a plurality of rows of contacts insulatedly mounted on said support for engagement with a row of terminals of the relay, a rotatable and slidable lever for sliding the movable framework toward and away from the relay, camming mechanism cooperating with said lever upon rotation thereof to cam the contact support downwardly against the action of the spring, and locking means for preventing the lever from sliding when the lever is rotated from its normal position and for preventing rotation of the lever in all of its positions except one.

ARVID N. HANSON.
STANLEY F. WARNER.